United States Patent
Sato et al.

(10) Patent No.: US 12,001,440 B2
(45) Date of Patent: Jun. 4, 2024

(54) PREDICTION DEVICE, PREDICTION METHOD, AND PREDICTION PROGRAM

(71) Applicant: NIPPON TELEGRAPH AND TELEPHONE CORPORATION, Tokyo (JP)

(72) Inventors: Daisuke Sato, Tokyo (JP); Tatsushi Matsubayashi, Tokyo (JP); Hiroyuki Toda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 198 days.

(21) Appl. No.: 17/621,228

(22) PCT Filed: Jun. 26, 2019

(86) PCT No.: PCT/JP2019/025473
§ 371 (c)(1),
(2) Date: Dec. 20, 2021

(87) PCT Pub. No.: WO2020/261448
PCT Pub. Date: Dec. 30, 2020

(65) Prior Publication Data
US 2022/0350801 A1 Nov. 3, 2022

(51) Int. Cl.
*G06F 16/30* (2019.01)
*G06F 16/2458* (2019.01)
*G06N 20/00* (2019.01)

(52) U.S. Cl.
CPC ...... *G06F 16/2477* (2019.01); *G06F 16/2465* (2019.01); *G06N 20/00* (2019.01)

(58) Field of Classification Search
CPC .......... G06F 16/2477; G06F 16/2465
See application file for complete search history.

(56) References Cited

U.S. PATENT DOCUMENTS

| 6,961,677 B1 * | 11/2005 | Boysworth | G06F 18/00 702/183 |
| 2007/0293959 A1 * | 12/2007 | Takezawa | G05B 13/048 700/44 |

(Continued)

FOREIGN PATENT DOCUMENTS

| JP | 2008152318 A | 7/2008 |
| JP | 200943291 A | 2/2009 |

(Continued)

*Primary Examiner* — Khanh B Pham

(57) ABSTRACT

A prediction device includes: a normal prediction unit configured to predict first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period; a residual extraction unit configured to extract, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals greater than or equal to a threshold value, as spatio-temporal residual data; a residual prediction unit configured to predict, based on the spatio-temporal residual data, second prediction values for the target ranges corresponding to the spatio-temporal residual data in accordance with a predetermined prediction technique; and a synthesis unit configured to output prediction values obtained by synthesizing the first prediction values and the second prediction values.

20 Claims, 5 Drawing Sheets

(56) References Cited

U.S. PATENT DOCUMENTS

| | | | |
|---|---|---|---|
| 2013/0073181 A1 | 3/2013 | Mamada | |
| 2019/0286724 A1* | 9/2019 | Kudo | G06N 20/10 |
| 2019/0354893 A1* | 11/2019 | Kim | G06N 20/00 |
| 2020/0036611 A1* | 1/2020 | Lu | H04L 43/062 |
| 2022/0067446 A1* | 3/2022 | Rajarathinam | G06F 18/217 |
| 2022/0138779 A1* | 5/2022 | Lloyd | G06Q 30/0202 |
| | | | 705/7.31 |
| 2022/0172130 A1* | 6/2022 | Wu | G06Q 30/0202 |

FOREIGN PATENT DOCUMENTS

| | | | |
|---|---|---|---|
| JP | 2009104408 A | 5/2009 | |
| JP | 201360927 A | 4/2013 | |
| JP | 201822237 A | 2/2018 | |

* cited by examiner

PREDICTION DEVICE, PREDICTION METHOD, AND PREDICTION PROGRAM

CROSS-REFERENCE TO RELATED APPLICATIONS

This application is a U.S. National Stage Application filed under 35 U.S.C. § 371 claiming priority to International Patent Application No. PCT/JP2019/025473, filed on 26 Jun. 2019, the disclosure of which is hereby incorporated herein by reference in its entirety.

TECHNICAL FIELD

The disclosed techniques relate to a prediction device, a prediction method, and a prediction program.

BACKGROUND ART

There are techniques related to spatio-temporal observation data where statistics having spatio-temporal expanse are observed at a time interval. The statistics are, for example, a flow of people, a flow of traffic, precipitation, the amount of chemical substance in the atmosphere, and the like. There are techniques for predicting a spatio-temporal variable value from a current time to a near future time by using spatio-temporal observation data observed from the current time to a past time.

A number of techniques for predicting spatio-temporal observation data have been proposed. Among these, the technique described in PTL 1 can predict spatio-temporal observation data including sudden variations different from a normal time, such as a sudden gathering of people in an event site, for example.

CITATION LIST

Patent Literature

PTL 1: JP 2018-22237 A

SUMMARY OF THE INVENTION

Technical Problem

The related-art approach described in the related art 1 updates a prediction model while capturing the updated spatio-temporal observation data observed sequentially in order to accurately capture variations in spatio-temporal observation data different from a normal time. At this time, the prediction model uses spatial and temporal correlation, and thus has an explanatory variable of the number of observation times*the number of observation locations. As a result, there is a problem in that the computational load becomes too large in order to update the prediction model sequentially when the spatio-temporal observation data handled is temporally and spatially highly dense and large in range.

The disclosed techniques have been made in light of the foregoing and have an object of providing a prediction device, a prediction method, and a prediction program capable of performing prediction for spatio-temporal observation data including variations that are different from a normal time while suppressing computational load.

Means for Solving the Problem

A first aspect of the present disclosure is a prediction device including: a normal prediction unit that predicts first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period; a residual extraction unit that extracts, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals greater than or equal to a threshold value, as spatio-temporal residual data; a residual prediction unit that predicts, based on the spatio-temporal residual data, second prediction values for the target ranges corresponding to the spatio-temporal residual data in accordance with a predetermined prediction technique; and a synthesis unit that outputs prediction values obtained by synthesizing the first prediction values and the second prediction values.

A second aspect of the present disclosure is a prediction method for causing a computer to execute processing, the processing including predicting first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period, extracting, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals greater than or equal to a threshold value, as spatio-temporal residual data, predicting, based on the spatio-temporal residual data, second prediction values for the target ranges corresponding to the spatio-temporal residual data in accordance with a predetermined prediction technique, and outputting prediction values obtained by synthesizing the first prediction values and the second prediction values.

A third aspect of the present disclosure is a prediction program causing a computer to execute: predicting first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period; extracting, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals greater than or equal to a threshold value, as spatio-temporal residual data; predicting, based on the spatio-temporal residual data, second prediction values for the target ranges corresponding to the spatio-temporal residual data in accordance with a predetermined prediction technique; and outputting prediction values obtained by synthesizing the first prediction values and the second prediction values.

Effects of the Invention

According to the disclosed techniques, it is possible to perform the prediction for spatio-temporal observation data including variations that are different from a normal time while suppressing computational load. Furthermore, by predicting and distinguishing the variations observed in the past and sudden variations that have not been previously observed, it is possible to achieve an improvement in overall prediction accuracy.

DESCRIPTION OF EMBODIMENTS

Figure 1:
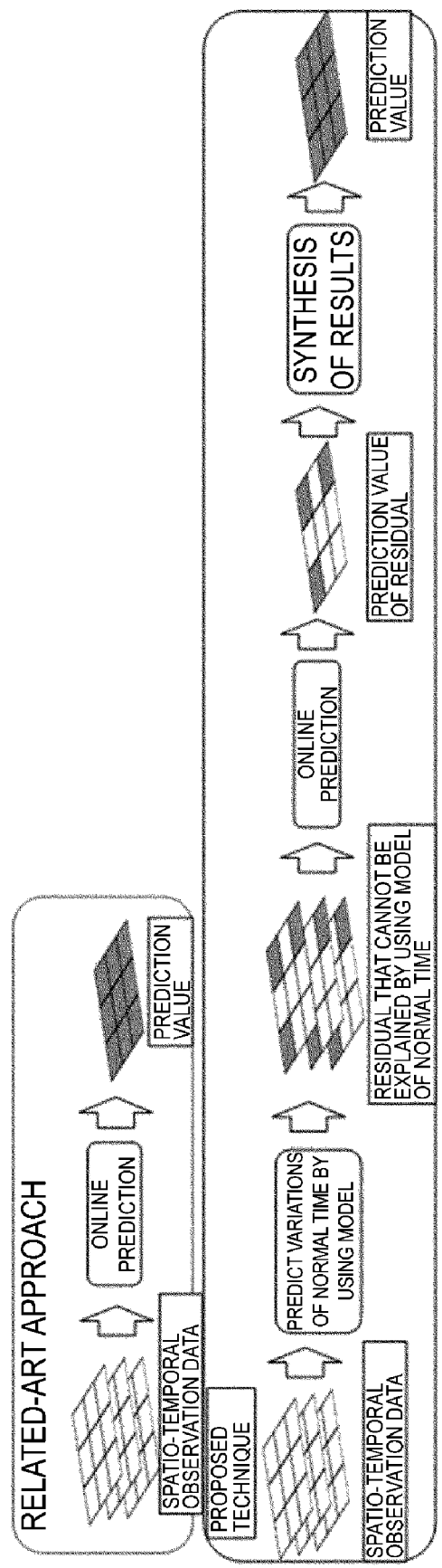
FIG. 1 is an image diagram comparing a related-art approach and a proposed technique of the present embodiment.

Hereinafter, one example of the embodiments of the disclosed techniques will be described with reference to the drawings. In the drawings, the same reference numerals are given to the same or equivalent constituent elements and parts. Dimensional ratios in the drawings are exaggerated for the convenience of description and thus may be differ from actual ratios.

First, a summary of the technique of the present disclosure will be described. As described in the above problems, the spatio-temporal prediction technique for sequentially performing updates can perform predictions that follow even sudden variations different from a normal time, for example, such as a sudden gathering of people in a large event site. As similar techniques, there are techniques for online prediction using spatio-temporal variables such as PTL 1. However, this spatio-temporal prediction technique has a problem in that the data density is high and the amount of calculation increases in a case of dealing with spatio-temporal observation data of a wide range. In order to solve this problem, in the present embodiment, the variations that can be explained by previously generated patterns and variations that cannot be explained by the previously generated patterns are separated and predicted, and the respective results are synthesized to perform prediction. Such a spatio-temporal prediction model with high computational load is applied only to variations that cannot be explained by the past patterns. FIG. 1 is an image diagram comparing a related-art approach and a proposed technique of the present embodiment.

A configuration in the present embodiment will be described below.

Figure 2:
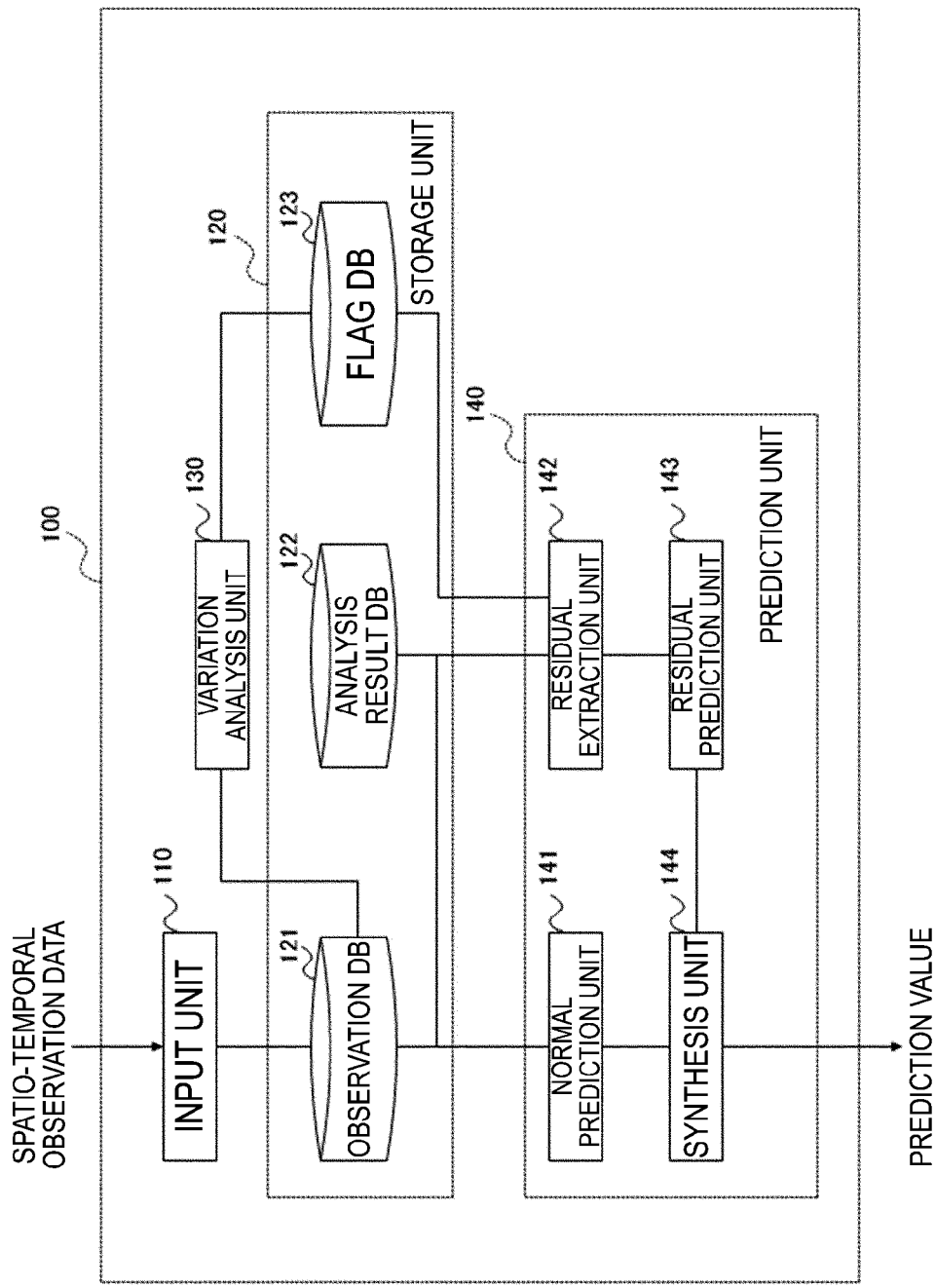
FIG. 2 is a block diagram illustrating a configuration of a prediction device according to the present embodiment.

FIG. 2 is a block diagram illustrating a configuration of a prediction device according to the present embodiment.

As illustrated in FIG. 2, the prediction device 100 includes an input unit 110, a storage unit 120, a variation analysis unit 130, and a prediction unit 140. The storage unit 120 includes an observation DB 121, an analysis result DB 122, and a flag DB 123. The prediction unit 140 includes a normal prediction unit 141, a residual extraction unit 142, a residual prediction unit 143, and a synthesis unit 144.

Figure 3:
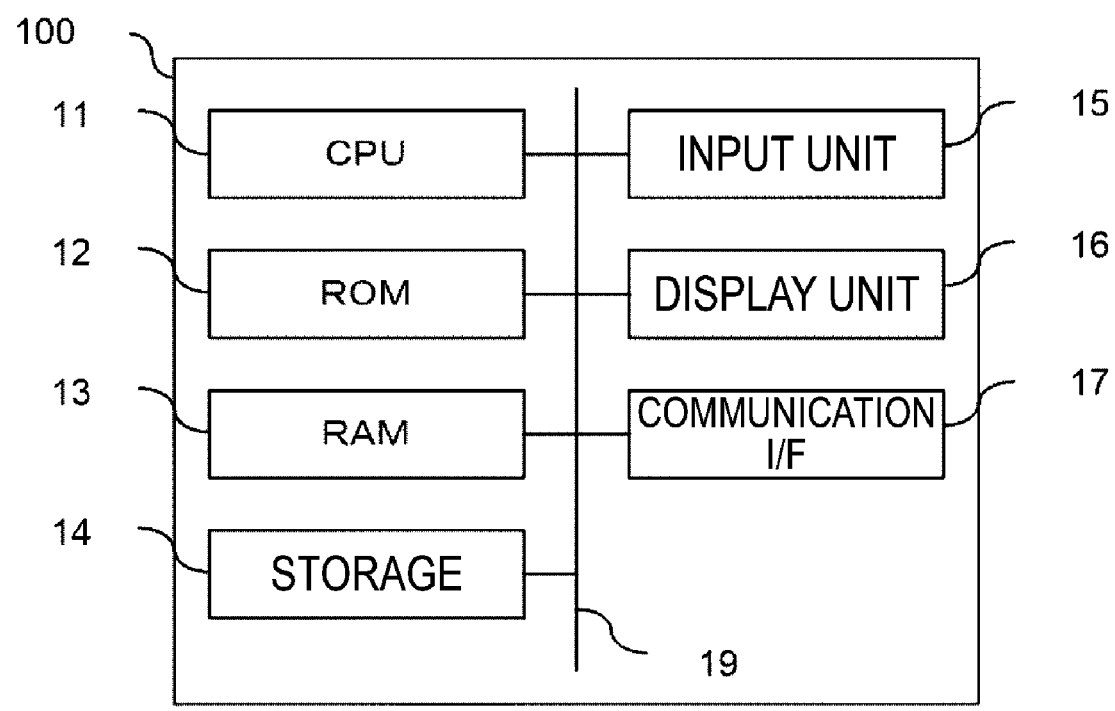
FIG. 3 is a block diagram illustrating a hardware configuration of the prediction device.

FIG. 3 is a block diagram illustrating a hardware configuration of the prediction device 100.

As illustrated in FIG. 3, the prediction device 100 includes a central processing unit (CPU) 11, a read only memory (ROM) 12, a random access memory (RAM) 13, a storage 14, an input unit 15, a display unit 16, and a communication interface (I/F) 17. The components are communicatively interconnected through a bus 19.

The CPU 11 is a central processing unit that executes various programs and controls each unit. In other words, the CPU 11 reads a program from the ROM 12 or the storage 14 and executes the program using the RAM 13 as a work area. The CPU 11 performs control of each of the components described above and various arithmetic operation processes in accordance with a program stored in the ROM 12 or the storage 14. In the present embodiment, a prediction program is stored in the ROM 12 or the storage 14.

The ROM 12 stores various programs and various kinds of data. The RAM 13 is a work area that temporarily stores a program or data. The storage 14 is constituted by a hard disk drive (HDD) or a solid state drive (SSD) and stores various programs including an operating system and various data.

The input unit 15 includes a pointing device such as a mouse and a keyboard and is used for performing various inputs.

The display unit 16 is, for example, a liquid crystal display and displays various kinds of information. The display unit 16 may employ a touch panel system and function as the input unit 15.

The communication interface 17 is an interface for communicating with other devices such as terminals and, for example, uses a standard such as Ethernet (trade name), FDDI, or Wi-Fi (trade name).

Next, each functional configuration of the prediction device 100 will be described. Each functional component is realized by the CPU 11 reading a prediction program stored in the ROM 12 or the storage 14, expanding the prediction program in the RAM 13 to execute the program.

The processing of the prediction device 100 is mainly divided into normal time variation analysis processing performed by the variation analysis unit 130 and prediction processing performed by the prediction unit 140. The normal time variation analysis processing is a process in which, for example, a prediction value of the spatio-temporal observation data in a normal time is determined as a model in advance. In the prediction processing, a target range for which there is spatio-temporal observation data which can be explained using the model is predicted by the model, and a target range in which sudden spatio-temporal observation data is occurring is predicted using a residual.

The prediction device 10 receives, as input, each of pieces of spatio-temporal observation data each including an observation value for each location and time of observation observed for a given time period. The input unit 110 stores each of the received spatio-temporal observation data in the observation DB 121.

The observation DB 121 is a database for storing the pieces of spatio-temporal observation data. The observation DB 121 stores, as spatio-temporal observation data, a set of an observation time at which an observation value is observed, an observation location at which the observation value is observed, and an observation value, for each observation time and each observation location. At this time, the data of the observation times and the observation locations store information required in the analysis technique of the variation analysis unit 130 and the residual prediction unit 143. For example, in a case where a periodic day of the week information is required in the analysis technique, the day of the week information is also stored in addition to the time information. In a case where the analysis technique requires an observation location name and coordinate information as identification information of each observation location, the pieces of information are also stored. The following process uses spatio-temporal observation data stored in the observation DB 121.

The analysis result DB 122 is a database for storing models that are output of the variation analysis unit 130. The output stored in the analysis result DB 122 is each of the models for describing variations in a normal time and is a model for predicting variation in the spatio-temporal observation data. The target range described by the models depends on the analysis technique of the variation analysis unit 130. Each of the models is stored in the analysis result DB 122 as an analysis result for each target range defined for at least one of the observation location and the period. For example, in a case where the analysis technique of the variation analysis unit 130 is a technique for analyzing the time-series data for each location, an analysis result is stored for each observation location. In a case where the analysis technique of the variation analysis unit 130 is a technique for analyzing the spatio-temporal data for each area that consists of a plurality of observation locations, analysis results are stored for each area. In a case where the analysis technique is a technique to analyze the spatio-temporal data for each day of the week or time of day, the analysis results are stored for each day of the week, or time of day. In a case where a model is a periodic model such as for each day of the week or time of day, the model may be a model for each day of the week or time of day for a certain observation location or area. The models of these analysis results are updated every time a flag of the normal time variation analysis processing is set. At this time, in a case where it is not necessary to use a model of a past analysis result, the model of the analysis result is overwritten at the time of the update. Note that a model ID is given to a model to identify which target range is indicated. The following process uses models stored in the analysis result DB 122.

The flag DB 123 is a database for storing flags of the models that perform the normal time variation analysis processing output from the residual extraction unit 142. Each of the stored flags is a binary value that represents whether or not update is needed; for example, 1 in a case where an update is needed, and 0 if not needed, or the like. Storage regions of these flags are provided for respective model IDs. In other words, in a case where the analysis technique is a technique for analyzing the time-series data for each location, flags are stored for the models of each observation location, and in a case where the analysis technique is a technique for analyzing the time-series data for each area that is composed of a plurality of observation locations, flags are stored for the models of each area.

The variation analysis unit 130 references a flag registered in the flag DB 123, and updates each model for which the flag for update is set. By using each of the observation values corresponding to the target range of the model stored in the observation DB 121, the variation analysis unit 130 analyzes variations in the target range of the model to update the model. The variation analysis unit 130 updates the corresponding model in the analysis result DB 122. Analysis of variations in a model is a process of analyzing variations in a normal time. In addition to a case of using an observation value of the spatio-temporal observation data as is, a use of spatio-temporal observation data subjected to preprocessing commonly used, such as a case of using a p-th order difference (p is a positive integer value) with a previous time, a case of using a moving average, or a case of performing normalization, is considered as an input of analysis. In a case where a temporal periodicity is found in the spatio-temporal observation data in advance, it is also conceivable to divide the spatio-temporal observation data for each period, for example, for each day of the week, or for each time of day, to perform analysis for the spatio-temporal observation data of the same period. The analysis technique uses any regression technique for time-series data such as an autoregressive model (AR), logistic regression, or the like. Various regression techniques may also be used for spatio-temporal observation data such as a vector autoregressive model (VAR), a state space model, a Gaussian process regression, or a recurrent neural network (RNN). After the analysis of the model has been completed, the variation analysis unit 130 deletes the flag of the updated model in the flag DB 123. Details of the processing in the variation analysis unit 130 are described later in the description of the effects. Note that in the initial state of the prediction device 100, the processing of the variation analysis unit 130 is performed at least once for all models to generate and store each of the models in the analysis result DB 122.

In this way, in the prediction device 10, the prediction processing of the prediction unit 140 is performed by using the model of the analysis result updated in the normal time variation analysis processing of the variation analysis unit 130, so a prediction value can be determined efficiently for variations in a normal time.

The normal prediction unit 141 predicts a first prediction value for a target range of each of the models, based on each of the pieces of spatio-temporal observation data and each of the models for each target range observed for a given time period. For example, the normal prediction unit 141 uses a model stored in the analysis result DB 122 to perform a prediction of a time $t_f$ being a prediction target. Details will be described later in a description of the effects.

Based on each of the pieces of spatio-temporal observation data and each of the models, the residual extraction unit 142 extracts spatio-temporal observation data, which is a residual equal to or greater than a threshold value, as spatio-temporal residual data, by the residual between each of the pieces of spatio-temporal observation data observed and the model corresponding to the spatio-temporal observation data. The flag to update a model with a residual greater than or equal to the threshold value is registered in the flag DB 123.

In the residual extraction unit 142, for example, a model stored in the analysis result DB 122 is applied to the spatio-temporal observation data of the most recent time period, and the residual between the observed spatio-temporal observation data and the model is calculated. The time period for the application of the model is set at a time period sufficient for the prediction technique of the residual prediction unit 143. In a case where the overall residual is large, then flags are set for the models of the entire flag DB 123. The determination about flagging is performed in units of model. Conceivable determination criterion for individually flagging the models include a method of flagging the model in a case where the sum of absolute values of the residuals exceeds a threshold value, and a method in which the largest value of the absolute values of the residuals exceeds a threshold value. In the residual extraction unit 142, in addition to flagging for reanalysis, the residual extraction unit 142 performs a processing for pruning data to reduce the amount of data handled by the residual prediction unit 143 and extracts spatio-temporal residual data. In this pruning process, observation locations for which variations can be almost explained by the model obtained by the normal time variation analysis processing are identified, and spatio-temporal residual data from which data of the observation locations are removed is extracted to reduce the amount of data. As a pruning criteria, a method is conceivable such as removing spatio-temporal observation data in which the maximum value of the absolute values of the residuals is below a threshold value, and removing spatio-temporal data in which the sum of the absolute values of the residuals is below a threshold value. In other words, the spatio-temporal residual data is a collection of pieces of spatio-temporal observation data that are in a range narrowed down to that necessary to catch sudden variations. Details will be described later in the description of the effects.

The residual prediction unit 143 predicts a second prediction value for a range predictable with the spatio-temporal residual data in accordance with a predetermined prediction technique, based on the spatio-temporal residual data extracted by the residual extraction unit 142. As a prediction technique used by the residual prediction unit 143, any prediction technique of a variety of prediction techniques for spatio-temporal observation data such as VAR, reduced rank regression, Gaussian process regression, or the technique used in PTL 1 may be used. Depending on the prediction technique to be used, the second prediction value of the observation location excluded by the pruning can also be output by performing spatial interpolation, but the second prediction value of the observation location excluded by the pruning may not be used. Details will be described later in the description of the effects.

The synthesis unit 144 outputs a prediction value obtained by synthesizing the first prediction value predicted by the normal prediction unit 141 and the second prediction value predicted by the residual prediction unit 143.

Next, effects of the prediction device 100 will be described. First, the prediction processing will be described.

Figure 4:
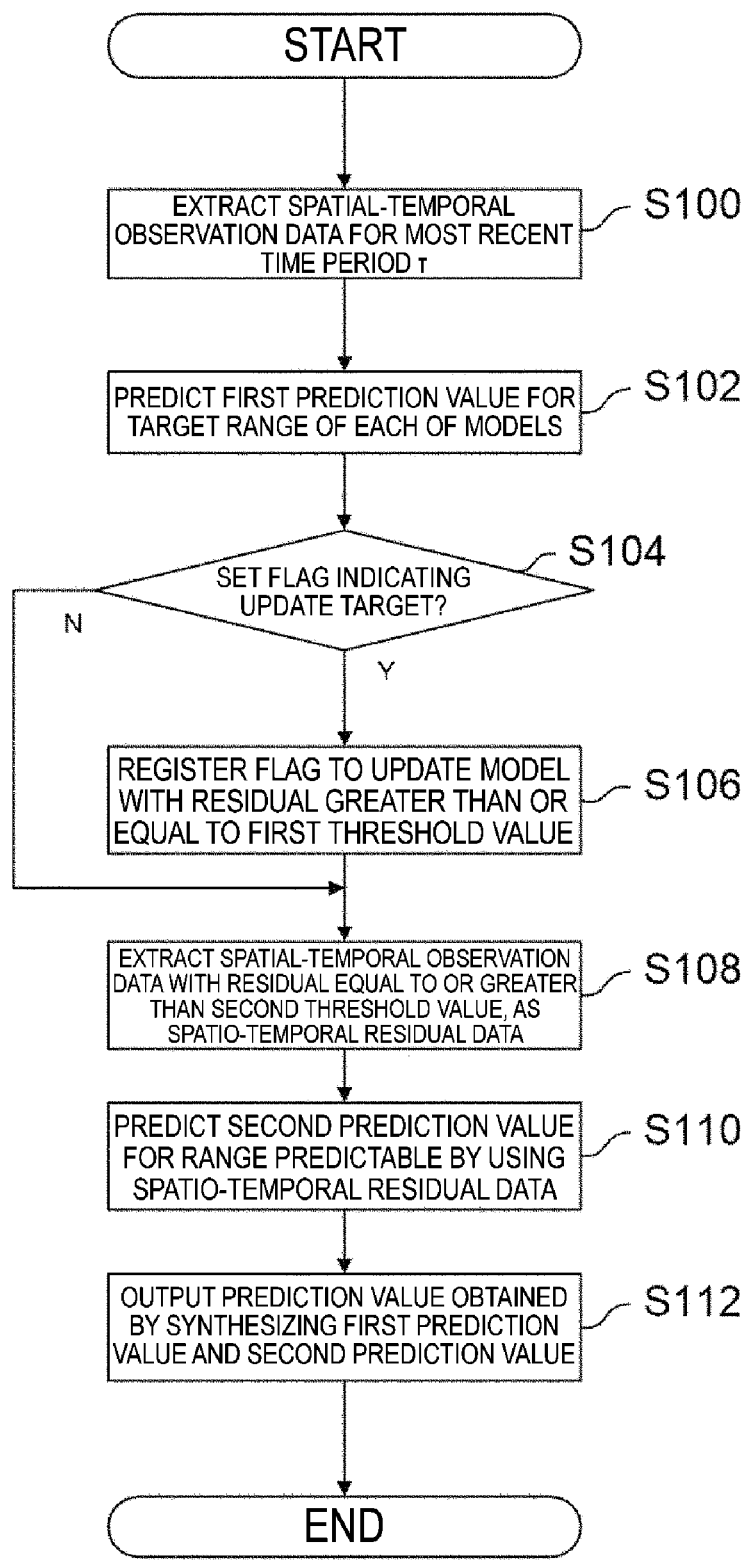
FIG. 4 is a flowchart illustrating a sequence of prediction processing performed by the prediction device.

FIG. 4 is a flowchart illustrating a sequence of the prediction processing performed by the prediction device 100. The CPU 11 reads the prediction program from the ROM 12 or the storage 14, expands the prediction program into the RAM 13, and executes the prediction program, whereby the prediction processing is performed. The prediction device 100 receives, as input, each of the pieces of most recent spatio-temporal observation data observed for a given time period, and stores the received data in the observation DB 121 by the input unit 110, and then performs the following processes. Note that it is assumed that at least one normal time variation analysis processing is already performed for all models in advance and each of the models of the analysis result DB 122 is already obtained.

At step S100, the CPU 11 extracts the spatio-temporal observation data of the most recent time period i from the observation DB 121. Note that the processing at step S100 is performed as the normal prediction unit 141.

At step S102, the CPU 11 predicts a first prediction value for the target range of each of the models, based on each of the spatio-temporal observation data and the model for each target range observed for a given time period. Details will be described below.

Specifically, in this step S102, for each of the pieces of spatio-temporal observation data of the time period i extracted at step S100, the model of the analysis result DB 122 is applied with the current time as t and the day of the week as $j_t$. In the present embodiment, a case is described in which, in the normal time variation analysis processing, a model is generated for predicting variations in a normal time with a range of time period T for each observation location, for each day of the week, and for each time of day, by using a clustering technique. The observation location to which the model is applied is denoted as i, and the spatio-temporal observation data of the most recent time period $\tau$ of the observation location i is denoted as $X_t$, $\{X_{t-\tau+1}, X_{t-\tau+2}, \ldots, X_t\}_t$. With the time of the prediction as $t_f$, the following model V, which is an analysis result for each cluster of the observation location i, the day of the week $j_t$, and the time $t_f$ is extracted from the analysis result DB 122.

$$V_{t_f,i,j_t,c} = \{v_{t_f-T+1}, v_{t_f-T+2}, \ldots, v_{t_f}, \ldots, v_{t_f}\}_{t_f,i,j_t,c}$$

As described above, the model V is represented by the target range for the cluster c of the observation location i (i∈I), the day of the week $j_t$ (j∈J), and the time $t_f$ (t ∈T). In other words, each of the models is a model of the cluster c∈C (c∈C: C is all clusters). In this case, it is only required that the model of the cluster c corresponding to the day of the week $j_t$ and the time $t_f$ in the target range corresponding to the time period i be extracted. Hereinafter, the indices $t_f$, i, and $j_t$, which represent the models in the target range, are briefly labeled with m, and the model V, which is the analysis result for each extracted cluster, is expressed as follows.

$$V_{m,c} = \{v_{t_f-T+1}, v_{t_f-T+2}, \ldots, v_{t_f}, \ldots, v_{t_f}\}_{m,c}$$

Next, the model is applied to the spatio-temporal observation data for each cluster, and the model is selected where the residual between the spatio-temporal observation data and the model is the smallest. In other words, a residual between the cluster and the spatio-temporal observation data is taken. The residual d ($X_{t, i}$, $w^*_c$, $V_{m, c}$) for each cluster is determined by $\Sigma a|x - w^* v_{a, m, c}|$ or $\Sigma a(x - w^* v_{a, m, c})^2$ or the like. Then, the cluster c*, in which the residual d ($X_{t, i}$, $w^*_c$, $V_{m, c}$) is the smallest is selected as a plausible cluster, i.e., a model. Here, a={$t_f$-T+1, $t_f$-T+2, . . . , t}, and a is the time set from the oldest time of the model to the newest time t of the data. $w_c$ is a scalar value representing a weight for adjusting a scale that is uniformly applied to each element of $V_{m, c}$. $w^*_c$ is a value at which the residual d ($X_{t, i}$, $w_c^*$, $V_{m, c}$) is smallest. However, in a case where the computational processing time is to be suppressed, this weight $w_c$ may not be used. The residual d ($X_{t, i}$, $w^*_{c*}$, $V_{m, c*}$) between the model and the data is determined as described above. The process of selecting the model is performed for all observation locations i included in the spatio-temporal observation data of the time period $\tau$. In this step S102, the model derived and to be selected to predict variations in the normal time applied to the spatio-temporal observation data is denoted as $w^*_c V_{m, c*}$ (where * is actually the superscript of c, hereinafter this notation is similarly applied). The model $w^*_c V_{m, c*}$ is used to predict variations in the normal time of the time of the prediction $t_f$. By the prediction, the first prediction value of the observation location i, the day of the week $j_t$, and the time of the prediction $t_f$ is determined. In the present embodiment, the following is used as the first prediction value included in the model $w^*_c V_{m, c*}$.

$$W^* V_{t_f,m,c*}$$

The above is a detail of the processing at step S102.

At step S104, the CPU 11 determines, for each of the models, whether or not to set a flag indicating an update target, and in a case where there is a model to flag, the process proceeds to step S106, and in a case where there is no model to flag, then the process proceeds to step S108. Here, based on the residual determined at step S102, by determining that the normal time variation analysis processing needs to be executed again for the model in which the residual is equal to or greater than a first threshold value, it is determined to flag the model. This determination is made for each model stored in the analysis result DB 122. As a determination criterion, for example, the flagging is performed depending on whether the residual $d(X_{t, i}, w^*_{c^*}, V_{m, c^*})$ between the model and the data is equal to or greater than the first threshold value. The criterion may be based on whether the maximum value max $(|x_a - w^* v_{a, m, c^*}|)$ of the residual vector elements below is above the first threshold value, rather than the sum of the residual vectors.

At step S106, the CPU 11 registers the flag to update the model in which the residual is greater than or equal to the first threshold value, in the flag DB 123. For example, the flag of the model of the flag DB 123 is set to 1.

At step S108, based on each of the spatio-temporal observation data and each of the models, the CPU 11 determines the residual between each of the pieces of spatio-temporal observation data observed and the model corresponding to the pieces of spatio-temporal observation data, and extracts spatio-temporal observation data with a residual equal to or greater than a second threshold value, as spatio-temporal residual data. Details will be described below.

The processing at the step S108 corresponds to a pruning process for reducing the amount of data handled in determining the second prediction value of next step S110. In the pruning process, the spatio-temporal observation data of each the observation location that can be explained by the model is removed. The pruning can be done based on the criterion whether the residual $d(X_{t, i}, w^*_{c^*}, V_{m, c^*})$ of each observation location i is above the second threshold value. The criterion may be based on whether the maximum value max $(|x_a - w^* v_{a, m, c^*}|)$ of the residual vector elements is above the second threshold value, rather than the sum of the residual vectors. The determination criterion and the second threshold value in this case need not be the same as the determination criterion and the first threshold value used in the determination of step S104. Of the pieces of spatio-temporal observation data included in the time period τ, the pieces of spatio-temporal observation data for the observation location i with a residual less than the second threshold value is excluded by the pruning, and a collection of pieces of remaining spatio-temporal observation data for the observation location i with a residual greater than or equal to the second threshold value is defined as spatio-temporal residual data.

At step S110, the CPU 11 predicts a second prediction value for a range predictable by the spatio-temporal residual data in accordance with a predetermined prediction technique, based on the spatio-temporal residual data extracted at step S108. The range predictable by the spatio-temporal residual data is each of the observation locations included in the spatio-temporal residual data. The prediction technique may use any technique of the above-described prediction techniques.

At step S112, the CPU 11 outputs a prediction value obtained by synthesizing the first prediction value predicted at step S102 and the second prediction value predicted at step S110 and terminates the processing. In the present embodiment, a synthesis is performed by adding together the first prediction value and the second prediction value for each observation location with a second prediction value, and the prediction value of the time of the prediction $t_f$ for each of the final observation locations is determined and output. For the prediction value of the observation location with no second prediction value, the first prediction value itself is used as the prediction value of the observation location.

Figure 5:
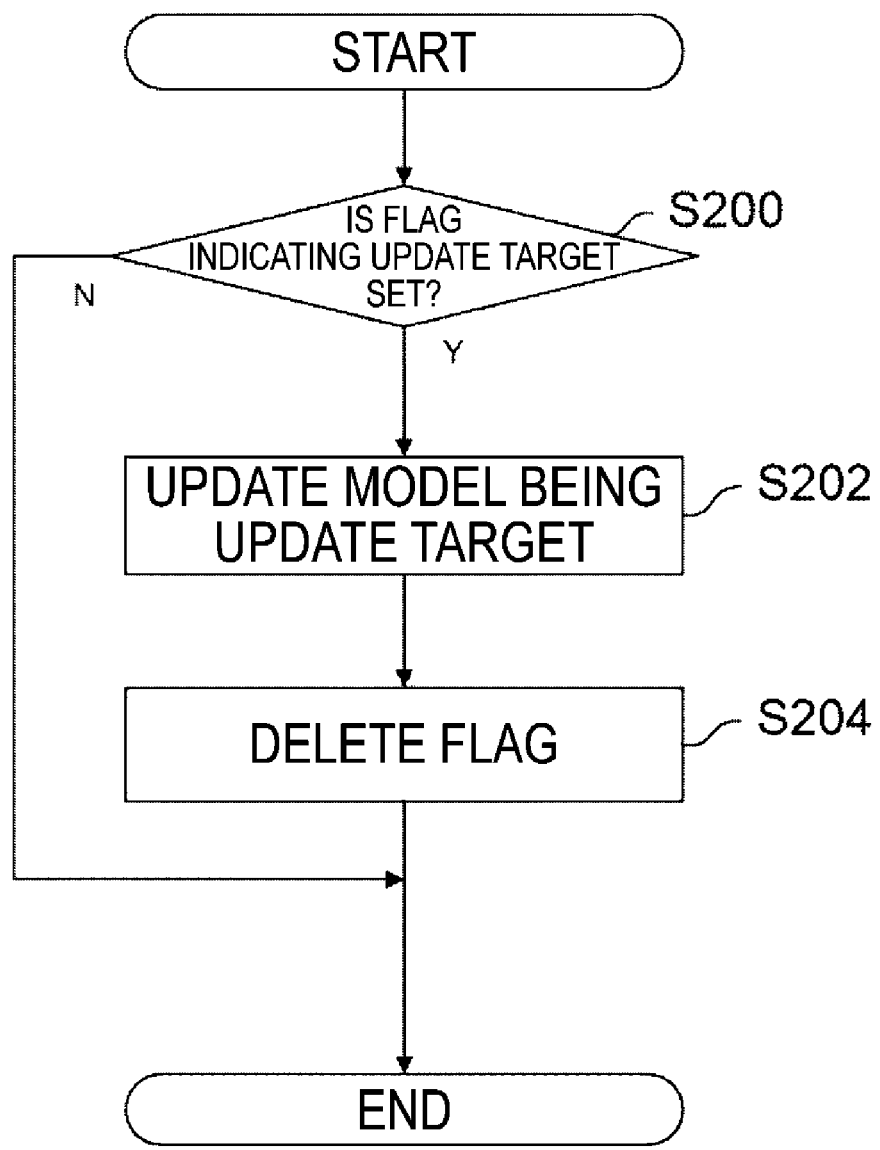
FIG. 5 is a flowchart illustrating a sequence of a normal time variation analysis processing performed by the prediction device.

Next, a normal time variation analysis processing will be described. The normal time variation analysis processing may be performed periodically or every time the spatio-temporal observation data is received. FIG. 5 is a flowchart illustrating a sequence of the normal time variation analysis processing performed by the prediction device 100. The CPU 11 reads the prediction program from the ROM 12 or the storage 14, expands the prediction program into the RAM 13, and executes the prediction program, whereby the normal time variation analysis processing is performed.

At step S200, the CPU 11 refers to the flag DB 123 to check whether there is a flagged model to be updated. In a case where there is a flagged model, then the process proceeds to step S202, and in a case where there is no flagged model, the process ends. The following steps are performed for each of flagged models.

At step S202, the CPU 11 updates the model by analyzing variations in the target range of the model by using each of the observation values corresponding to the target range of the model stored in the observation DB 121. Details will be described below.

The processing of step S202 is divided into the following processes (1) and (2). In (1), first, the spatio-temporal observation data of the target range to be analyzed for variation is extracted from the observation DB 121. In the present embodiment, a method of generating or updating a model with a range of time periods T for each observation location, for each day of the week, and for each time of day is described. To generate a model of the observation location i, day of the week j, and the time k ($k \in K$), the observation value of the spatio-temporal data of the time {k=T+1, k=T+2, . . . , k} of the time period T including the time k of the observation location i and the day of the week j is extracted from the observation DB 121. I represents all the observation locations included in the observation DB 121, J represents all the days of the week included in the observation DB 121, and K represents all the observation times included in the observation DB 121. Since the time in this case does not include the date, a data set of observations for the time period T is extracted for a plurality of days from the observation DB 121. The next process (2) is performed by using the extracted data set.

In (2), the model is constructed based on the extracted data set. Techniques for model generation can utilize various techniques of time series regression. In a case where the number of pieces of data that can be extracted is small, the extracted data set itself may be used as a model, but in the present embodiment, a case in which a clustering technique is used is described. A clustering technique is applied to the plurality of pieces of data with the time period T extracted in (1) and similar pieces of data are summarized into a cluster. For the clustering technique here, techniques such as k-means, or x-means can be used. In a case where the time period T is long and the number of elements included in one piece of data is large, the number of dimensions may be reduced by principal component analysis or the like before clustering is performed. The value of the centroid for each output cluster or the average value of the clusters is stored as a model in the analysis result DB 122. A cluster c is a model of the analysis results for the set of the observation location i, and the day of the week j, and the time k. The model is a vector of the value of the cluster c centroid or the average value $\{v_{k-T+1}, v_{k-T+2}, \ldots, v_k\}_{k, i, j, c}$, and models for all updated clusters are stored. As described above, updating only the models being update targets increases the efficiency of the relearning.

At step S204, the CPU 11 deletes the flags indicating update targets. For example, for the updated models, flags of the models in the flag DB 123 are set to 0.

As described above, according to the prediction device 100 of the present embodiment, the prediction for spatio-temporal observation data including variations that are different from the normal time can be performed while the computational load is suppressed.

Note that the normal time variation analysis processing performed by the variation analysis unit 130 may be performed by another device. In such a case, the prediction device 100 includes the storage unit 120 and the prediction unit 140. The flag DB 123 may be referenced from another device to update the models in the analysis result DB 122.

Note that, various processors other than the CPU may execute prediction processing and normal time variation analysis processing executed by reading software (program) by the CPU in each of the above-described embodiments. Examples of the processor in such a case include a programmable logic device (PLD) such as a field-programmable gate array (FPGA) of which circuit configuration can be changed after manufacturing, a dedicated electric circuit such as an application specific integrated circuit (ASIC) that is a processor having a circuit configuration designed dedicatedly for executing a specific process, and the like. The prediction processing and normal time variation analysis processing may be executed by one of such various processors or may be executed by a combination of two or more processors of the same type or different types (for example, a plurality of FPGAs, a combination of a CPU and an FPGA, or the like). More specifically, the hardware structure of such various processors is an electrical circuit acquired by combining circuit devices such as semiconductor devices.

In the embodiments described above, an aspect has been described in which the prediction program is stored (installed) in advance in the storage 14, but the present disclosure is not limited thereto. The program may be provided in the form of being stored in a non-transitory storage medium such as a compact disk read only memory (CD-ROM), a digital versatile disk read only memory (DVD-RAM), or a universal serial bus (USB) memory. The program may be in a form that is downloaded from an external device via a network.

With respect to the above embodiments, the following supplements are further disclosed.

Supplementary Note 1

A prediction device including:
a memory; and
at least one processor connected to the memory,
wherein the processor is configured to:
predict a first prediction value for each of target ranges of respective models, based on each of pieces of spatio-temporal observation data including an observation value for each observation location and each observation time observed for a given time period and each of the models for predicting variations of the piece of spatio-temporal observation data for the respective target ranges defined for at least one of an observation location and a period,
extract, based on a residual between each of the pieces of spatio-temporal observation data being observed and the model corresponding to the piece of spatio-temporal observation data based on the pieces of spatio-temporal observation data and the models, each of the pieces of spatio-temporal observation data with a residual greater than or equal to a threshold value, as spatio-temporal residual data,
predict, based on the spatio-temporal residual data, a second prediction value for the target range corresponding to the spatio-temporal residual data in accordance with a predetermined prediction technique, and
output a prediction value obtained by synthesizing the first prediction value and the second prediction value.

Supplementary Note 2

A non-transitory storage medium storing a prediction program causing a computer to execute:
predicting a first prediction value for each of target ranges of respective models, based on each of pieces of spatio-temporal observation data including an observation value for each observation location and each observation time observed for a given time period and each of the models for predicting variations of the piece of spatio-temporal observation data for the respective target ranges defined for at least one of an observation location and a period,
extracting, based on a residual between each of the pieces of spatio-temporal observation data being observed and the model corresponding to the piece of spatio-temporal observation data based on the pieces of spatio-temporal observation data and the models, each of the pieces of spatio-temporal observation data with a residual greater than or equal to a threshold value, as spatio-temporal residual data,
predicting, based on the spatio-temporal residual data, a second prediction value for the target range corresponding to the spatio-temporal residual data in accordance with a predetermined prediction technique, and
outputting a prediction value obtained by synthesizing the first prediction value and the second prediction value.

REFERENCE SIGNS LIST

100 Prediction device
110 Input unit
120 Storage unit
130 Variation analysis unit
140 Prediction unit
141 Normal prediction unit
142 Residual extraction unit
143 Residual prediction unit
144 Synthesis unit
121 Observation DB
122 Analysis result DB
123 Flag DB

The invention claimed is:

1. A prediction device comprising circuit configured to execute operations comprising:
predicting first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period;

extracting, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals based on a threshold value, as spatio-temporal residual data;

predicting, based on the spatio-temporal residual data, second prediction values for the target ranges corresponding to the spatio-temporal residual data in accordance with a predetermined prediction technique;

synthesizing the first prediction values and the second prediction values to generate output prediction values; and outputting the output prediction values.

2. The prediction device according to claim 1, the circuit further configured to execute operations comprising:
registering, in a storage, flags for updating the respective models with the residuals equal to or greater than the threshold value.

3. The prediction device according to claim 2, the circuit further configured to execute operations comprising:
referring to the respective flags registered in the storage;
analyzing for the models corresponding to the flags, variations in the target ranges of the models by using respective observation values corresponding to the target ranges of the models stored in the storage; and
updating the models.

4. The prediction device according to claim 3, wherein the analyzing variations in the target ranges of the models is based on one of regression including an autoregressive model or logistic regression.

5. The prediction device according to claim 1, wherein the models include a periodic model for one of: each day of the week, time of day.

6. The prediction device according to claim 1, wherein the spatio-temporal residual data excludes the respective pieces of spatio-temporal observation data with residuals less than the threshold value.

7. The prediction device according to claim 1, wherein the predetermined prediction technique includes one of a vector autoregressive model, reduced rank regression, or Gaussian process regression.

8. A computer-implemented method for predicting data comprising:
predicting first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period;

extracting, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals based on a threshold value, as spatio-temporal residual data;

predicting, based on the spatio-temporal residual data, second prediction values for the target ranges corresponding to the spatio-temporal residual data in accordance with a predetermined prediction technique;

synthesizing the first prediction values and the second prediction values to generate prediction values; and outputting the prediction values.

9. The prediction method according to claim 8, further comprising:
registering, in a storage, flags for updating the respective models with the residuals equal to or greater than the threshold value.

10. The prediction method according to claim 9, further comprising:
referring to the respective flags registered in the storage; and
analyzing, for the models corresponding to the flags, variations in the target ranges of the models by using respective observation values corresponding to the target ranges of the models stored in the storage; and
updating the models.

11. The computer-implemented method according to claim 10, wherein the analyzing variations in the target ranges of the models is based on one of regression including an autoregressive model or logistic regression.

12. The computer-implemented method according to claim 8, wherein the models include a periodic model for one of: each day of the week, time of day.

13. The computer-implemented method according to claim 8, wherein the spatio-temporal residual data excludes the respective pieces of spatio-temporal observation data with residuals less than the threshold value.

14. The computer-implemented method according to claim 8, wherein the predetermined prediction technique includes one of a vector autoregressive model, reduced rank regression, or Gaussian process regression.

15. A computer-readable non-transitory recording medium storing computer-executable program instructions that when executed by a processor cause a computer system to execute operations comprising:
predicting first prediction values for target ranges of respective models, based on respective pieces of spatio-temporal observation data including observation values for respective observation locations and respective observation times observed for a given time period and the respective models for predicting variations of the pieces of spatio-temporal observation data for the respective target ranges defined for at least one of an observation location or a period;

extracting, based on residuals between the respective pieces of spatio-temporal observation data being observed and the models corresponding to the respective pieces of spatio-temporal observation data based on the pieces of spatio-temporal observation data and the models, the respective pieces of spatio-temporal observation data with residuals based on a threshold value, as spatio-temporal residual data;

predicting, based on the spatio-temporal residual data, second prediction values for the target ranges corresponding to the spatio-temporal residual data in accordance with a predetermined prediction technique;

synthesizing the first prediction values and the second prediction values to generate prediction values; and outputting the prediction values.

16. The computer-readable non-transitory recording medium according to claim 7, the computer-executable program instructions when executed further causing the system to execute operations comprising:
registering, in a storage, flags for updating the respective models with the residuals equal to or greater than the threshold value.

17. The computer-readable non-transitory recording medium according to claim 15, the computer-executable program instructions when executed further causing the system to execute operations comprising:
  referring to the respective flags registered in the storage;
  analyzing, for the models corresponding to the flags, variations in the target ranges of the models by using respective observation values corresponding to the target ranges of the models stored in the storage; and
  updating the models.

18. The computer-readable non-transitory recording medium according to claim 15, wherein the models include a periodic model for one of: each day of the week, time of day.

19. The computer-readable non-transitory recording medium according to claim 15, wherein the spatio-temporal residual data excludes the respective pieces of spatio-temporal observation data with residuals less than the threshold value.

20. The computer-readable non-transitory recording medium according to claim 15, wherein the predetermined prediction technique includes one of a vector autoregressive model, reduced rank regression, or Gaussian process regression.

\* \* \* \* \*